US012612928B2

(12) United States Patent (10) Patent No.: US 12,612,928 B2
Le et al. (45) Date of Patent: Apr. 28, 2026

(54) MECHANISM FOR REGULATING HIGH PRESSURE INDUSTRIAL AIR USING DOUBLE LAYER ELECTROMAGNETIC VALVES

(71) Applicant: VIETTEL GROUP, Ha Noi City (VN)

(72) Inventors: Hoang An Le, Ha Noi City (VN); Ky Nam Pham, Ha Noi City (VN); Thi Nhu Trang Nguyen, Ha Noi City (VN)

(73) Assignee: VIETTEL GROUP, Ha Noi City (VN)

( * ) Notice: Subject to any disclaimer, the term of this patent is extended or adjusted under 35 U.S.C. 154(b) by 227 days.

(21) Appl. No.: 18/404,246

(22) Filed: Jan. 4, 2024

(65) Prior Publication Data

US 2024/0360845 A1      Oct. 31, 2024

(30) Foreign Application Priority Data

Apr. 27, 2023    (VN) ............................... 1-2023-02836

(51) Int. Cl.
 *F15B 1/033* (2006.01)
 *F15B 1/08* (2006.01)
 *F15B 13/04* (2006.01)
 *G05D 16/20* (2006.01)
(52) U.S. Cl.
 CPC ............... *F15B 1/033* (2013.01); *F15B 1/08* (2013.01); *F15B 13/0417* (2013.01); *F15B 2201/205* (2013.01); *F15B 2201/4053* (2013.01); *F15B 2201/411* (2013.01); *G05D 16/2022* (2019.01)
(58) Field of Classification Search
 CPC .... F15B 1/033; F15B 1/04; F15B 1/08; F15B 13/0417; F15B 2201/205; F15B 2201/4053; F15B 2201/411; F15B 2201/4155; F15B 9/03; F15B 9/07; F15B 9/08; F15B 9/09; F15B 9/10; F15B 9/16; F15B 9/17; F16K 37/0033; F16K 37/005; F16K 31/082; F16K 11/065–0716; F16K 37/0041; F16K 31/14; F16K 31/0603; F16K 31/0675; F16K 31/0679; F16K 31/084; G05D 16/2093
 USPC .............. 251/129.04, 129.2, 65, 68, 129.07; 137/557
 See application file for complete search history.

(56) References Cited

U.S. PATENT DOCUMENTS

| | | | | |
|---|---|---|---|---|
| 4,203,571 | A * | 5/1980 | Ruchser | ................. F16K 35/04 137/625.69 |
| 6,068,447 | A * | 5/2000 | Foege | ................... F04B 49/225 417/12 |
| 6,308,690 | B1 * | 10/2001 | Sturman | ............. F02M 59/105 123/90.12 |
| 7,789,066 | B2 * | 9/2010 | Torii | ................ F02M 35/10255 123/336 |
| 10,613,553 | B2 * | 4/2020 | van der Merwe | .... F16K 31/003 |

* cited by examiner

*Primary Examiner* — Craig J Price
(74) *Attorney, Agent, or Firm* — patenttm.us

(57) ABSTRACT

The mechanism in the invention provides a solution for automated, remote regulating high pressure air in the industrial air tube system. With double layer electromagnetic valves, the mechanism assure the comfortable and safe working platform for humans and equipment. The mechanism comprises: mechanical valve, 20 L pneumatic tank, pressure gauge, sealed metal box, static disc, electromagnetic relay with movable stem, capacitor, low pressure air tube, high pressure air tube, electrical wire, electromagnetic relay.

1 Claim, 1 Drawing Sheet

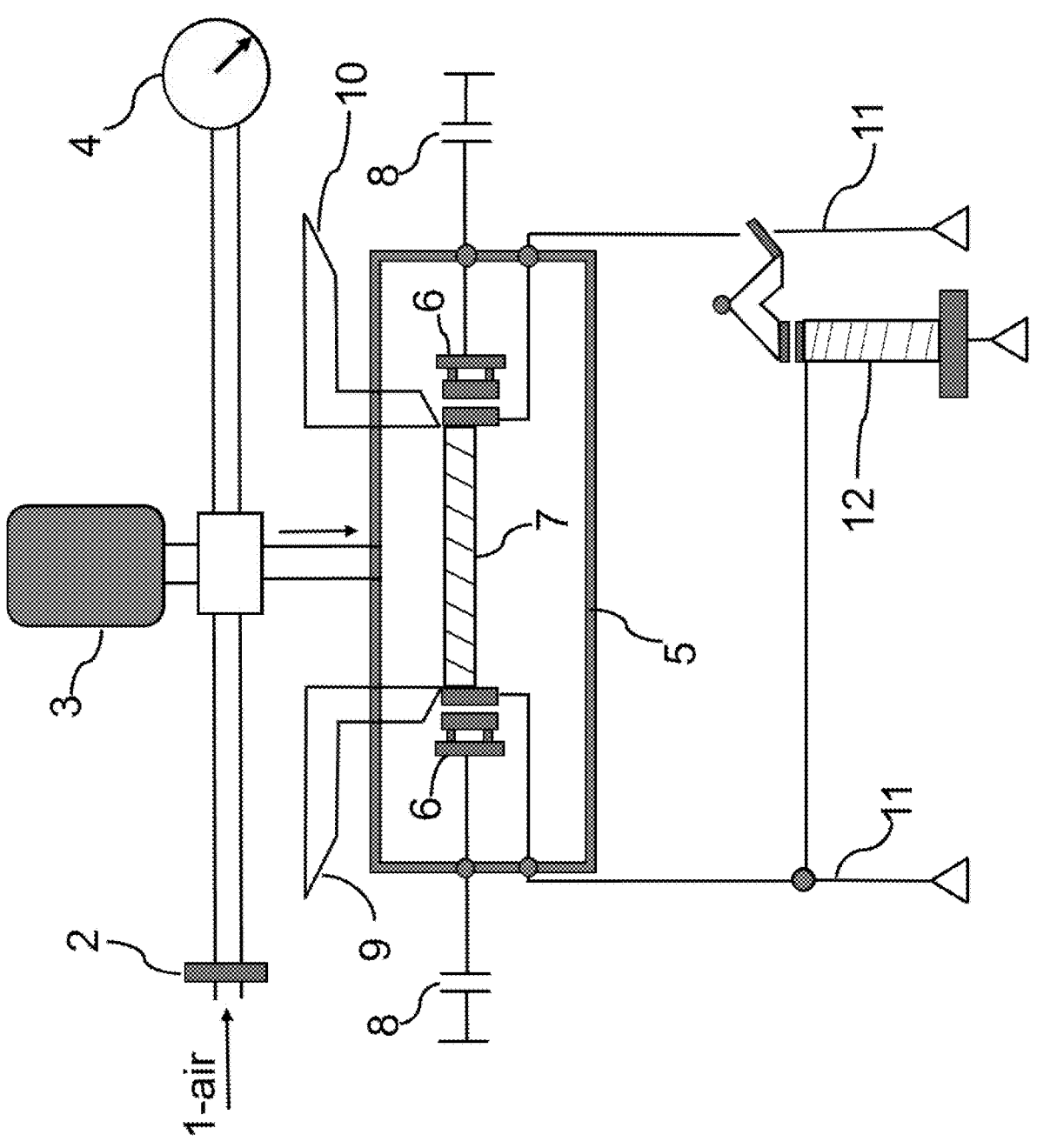

MECHANISM FOR REGULATING HIGH PRESSURE INDUSTRIAL AIR USING DOUBLE LAYER ELECTROMAGNETIC VALVES

FIELD OF THE INVENTION

The invention is directed to a double layer electromagnetic valve mechanism for regulating high pressure industrial air system. More particularly, the invention provides a solution for automated, remote controlling the high pressure air flow, bringing a comfortable and safe working platform for humans.

BACKGROUND DESCRIPTION

The switch mechanism is crucial for any high pressure pneumatic system as it makes sure the safeness and effectiveness of the devices and equipment using the high pressure air as well as for humans operating the systems. In facts, due to the high frequency of work and the quality of valves, many accidents happen during the time of working with very high pressure pneumatic systems.

Nowadays, there is a diversity of switch mechanisms for opening and shutting down of high pressure air system with different designs and working principles. Based on field of study, fluid types, the switch valves for high pressure applications are classified into 3 categories: mechanical, electromagnetic and the hybrid between mechanical and electromagnetic. In which, the mechanical valves are durable but not very safe as they are operated manually from a close distance, the electromagnetic valves are normally not very durable under high pressure, the hybrid valves are often big and designed for specific applications.

To overcome the disadvantages of these valves mentioned above, this invention provides a mechanism for regulating high pressure industrial air using double layer electromagnetic valves providing a safe and effective working solution.

TECHNICAL BACKGROUND OF THE INVENTION

The purpose of the invention is to propose a mechanism for switching ON/OFF, regulating and controlling pressure level of high pressure industrial air. The mechanism in this invention comprises of 11 parts/units assembled in a sealed box, including: a mechanical valve 2, 20 L pneumatic storage tank 3, pressure gauge 4, sealed metal box 5, static disc 6, electromagnetic relay with movable stem 7, capacitor 8, low pressure air tube 9, high pressure air tube 10, electrical wire 11, electromagnetic relay 12.

The mechanism in the invention takes advantages of shape, materials and stable working principle of the electromagnet to build up separate modules, then assemble them together in the way that it can regulate the high pressure air flow with safeness and effectiveness. The two electromagnetic valves with high capacity are integrated sequentially, one is inside the sealed box, the other is outside the sealed box to add more layers of safeness to the mechanism. The electromagnetic valve outside the sealed box is directly connected to the power source, working as a ON/OFF switch for the second electromagnetic valve inside the sealed metal box. If the electric overload happens, the coil wound around the core tube in the first electromagnetic valve will be broken, and the second electromagnetic valve will be disconnected from the power source, thus, keep the system safe. The second electromagnetic valve is attached to two metal bars at its two ends. The two metal bars are covered by the insulating rubber to protect the surfaces of metal bars. When the electricity goes through the two electromagnetic valves, (the electromagnetic valve outside the sealed metal box is closed) the metal bars will attach the static disc. The distance between the metal bars and the static disc will open/close or adjusting the cross section of the air tube, thus regulating the air pressure at the outlet.

BRIEF DESCRIPTION OF THE DRAWINGS

FIG. 1 constitutes a schematic drawing of the mechanism for regulating high pressure air system in accordance with the invention.

DETAILED DESCRIPTION OF THE INVENTION

The invention is described in the detailed description by the references made to the schematic drawings. However, to any person or ordinary skill in the art, the understanding of these references is not limited by what illustrated in the above drawings. The design of this invention could also be innovated and/or modified but committed to stay in the boundary conditioned by the safety specifications. Therefore, the embodiments of the invention described with reference to figures are only served as illustrative purpose, and do not set any limitation for the invention.

Refer to FIG. 1, the mechanism in the invention comprises of 11 parts/units:

Mechanical valve 2: manually operated, integrated at the inlet of the mechanism to open/close the high pressure air flow that goes into the mechanism.

20 L pneumatic tank 3: made from materials that can withstand high pressure. This tank is used to store the air and make the air stable before going inside the system. The tank is place right after the mechanical valve 2 to make sure this tank is always fully filled, thus, the system will not be shocked when the first electromagnetic valve is opened.

Pressure gauge 4: is an electronic gauge that can measure pressure in the range from 0 to 40 atm, with accuracy 0.1 atm. The pressure gauge 4 is placed at least 0.5 m away from 20 L pneumatic tank and the sealed metal box, to make sure the air flow passing by the gauge is stable and the pressure value displayed is accurate.

Sealed metal box 5: fully air sealed, and can withstand high pressure similar the to 20 L pneumatic tank. This box stores the second electromagnetic valve inside, bringing safeness to the human operating nearby.

The static disc 6: it is fixed inside the sealed metal box 5 and is made from metal.

The electromagnetic relay and the movable stem 7: made from metal, it can move inside the sealed metal box 5 under the magnetic flux. It is placed fully inside the sealed metal box 5, near the outlet of the air flow. The movement of the relay and the stem can adjust the air tube of the outlet, thus, regulating the pressure of the air flow outside the sealed metal box 5.

Capacitor 8: is used to discharge the electricity when the second electromagnetic valve inside the box switch from charging to discharging to move. The capacitor 8 is place outside the sealed metal box 5, one end of the capacitor is connected to the static discs 6, the other end is grounded.

Low pressure air tube 9: the outlet tube of low pressure air flow.

High pressure air tube 10: the outlet tube of high pressure air flow.

Electrical wire 11 is used for power distribution to transmit electricity from a transformer or other source to the mechanism.

Electromagnetic relay 12: is used to open, close, regulate the electric power for the electromagnetic valve 7. The relay 12 is placed outside the sealed metal box 5, and is connected to the electromagnetic relay and movable stem 7.

Comprising of the components above, the working principle of the mechanism in the invention can be described as followed: the air flow 1 is released from pneumatic air compressor to the air tube system, pass through the mechanical valve 2 to a connecting block and then branching to the 20 L pneumatic tank, the pressure gauge 4, and the sealed metal box 5. The metal box 5 is fully air sealed, containing the low pressure air tube 9 and high pressure air tube 10 which are connected to the outlet. The metal box 5 also contains the static disc 6 and electromagnetic valve 7. The cross section of the air tube at the outlet is controlled by the distance between the static disc 6 and the movable stem in the electromagnetic valve 7, thus, controlling the pressure of the air at the outlet in the tube 9 and tube 10. When the electromagnetic valve 7 is closed, electric current from the movable stem in the valve 7 will pass through the static disc, charged at capacitor 8 and discharged to the ground.

The invention claimed is:

1. A mechanism for regulating high pressure industrial air, wherein the mechanism comprises:

a mechanical valve which is manually operable, placed at an inlet of the mechanism, said mechanical valve for opening/closing an air flow to the mechanism;

a 20 L pneumatic tank made of high strength materials adapted to withstand high pressure, said 20 L pneumatic tank adapted to store and keep the high pressure industrial air stable inside when the mechanism is working;

an electronic pressure gauge capable of measuring pressure in a range from 0 to 40 atm, with accuracy 0.1 atm, the electronic pressure gauge positioned at least 0.5 m away from the 20 L pneumatic tank and a sealed metal box, to ensure the air flow passing by the electronic pressure gauge is stable and a pressure value displayed by the electronic pressure gauge is accurate;

a sealed metal box which is air sealed, adapted to withstand high pressure corresponding to the 20 L pneumatic tank, wherein the sealed metal box stores an electromagnetic valve inside;

wherein the 20 L pneumatic tank is placed right after the mechanical valve, to ensure the 20 L pneumatic tank is always filled, preventing a pressure shock when the mechanical valve is opened or closed;

a static metal disc fixed inside the sealed metal box;

an electromagnetic relay and a movable metal stem, placed inside the sealed metal box, near an outlet of air flow, the movable metal stem adapted to move inside the sealed metal box under magnetic flux; movement of the electromagnetic relay and the movable metal stem adjusts a cross section of an air tube of the outlet of the air flow, thus, regulating pressure of the air flow outside the sealed metal box;

a capacitor for discharging electricity when a second electromagnetic valve inside the sealed metal box switches from charging to discharging, the capacitor is placed outside the sealed metal box, a first end of the capacitor is connected to the static metal disc, a second end of the capacitor is grounded;

wherein a second electromagnetic relay outside the sealed metal box is used to open, close, and regulate electric power for the electromagnetic valve inside the sealed metal box, the second electromagnetic relay is placed outside the sealed metal box and is connected to the electromagnetic relay and the movable metal stem inside the sealed metal box;

a tube at an outlet for low pressure air flow;

a tube at an outlet for high pressure air flow;

an electrical wire transferring current from a power source, the electrical wire passing through the second electromagnetic relay outside the sealed metal box to the electromagnetic valve inside the sealed metal box and to the capacitor.

* * * * *